United States Patent [19]

Walther et al.

[11] Patent Number: 5,493,471
[45] Date of Patent: Feb. 20, 1996

[54] OUTPUT CAPACITOR ARRAY OF A SWITCHED-MODE POWER SUPPLY

[75] Inventors: Peter Walther, Michelstadt; Laurenz Langemeyer, Schönbrunn Haag, both of Germany

[73] Assignee: ABB Patent GmbH, Mannheim, Germany

[21] Appl. No.: 88,217

[22] Filed: Jul. 6, 1993

[30] Foreign Application Priority Data

Jul. 4, 1992 [DE] Germany .......................... 42 22 068.8

[51] Int. Cl.⁶ .................................................. H01G 4/38
[52] U.S. Cl. .................................. 361/328; 307/109
[58] Field of Search .......................... 361/328— 330, 361/541, 820, 830, 601, 602, 763, 766; 257/532, 72 TR; 174/45 R, 148, 252, 254, 255; 211/107; 331/113 A; 248/676; 307/109, 110

[56] References Cited

U.S. PATENT DOCUMENTS

| 3,234,433 | 2/1966 | Braunagel | 174/262 |
| 4,694,123 | 9/1987 | Massey | 361/775 |
| 4,905,123 | 2/1990 | Windle | 361/775 |

FOREIGN PATENT DOCUMENTS

| 0334520 | 9/1989 | European Pat. Off. . | |
| 0495470 | 7/1992 | European Pat. Off. . | |
| 0239786 | 9/1992 | European Pat. Off. . | |
| 8201682 | 1/1985 | France . | |
| 3205650 | 4/1986 | Germany . | |
| 3518236 | 11/1986 | Germany | 361/328 |
| 3900512 | 7/1990 | Germany . | |
| 9007402 | 7/1991 | Germany . | |
| 6029149 | 2/1994 | Japan | 361/328 |

OTHER PUBLICATIONS

European Search Report.

*Primary Examiner*—Bot L. Ledynh
*Attorney, Agent, or Firm*—Herbert L. Lerner; Laurence A. Greenberg

[57] ABSTRACT

An output capacitor array of a switched-mode power supply includes at least one substrate having a layered stack of a positive-pole metal foil, an insulating foil, and a negative-pole metal foil. A plurality of electrically parallel connected individual capacitors are disposed on the at least one substrate. The capacitors have positive poles each being electrically conductively connected to the positive-pole metal foil, and negative poles each being electrically conductively connected to the negative-pole metal foil. A solid negative-pole metal rail is electrically conductively connected to the negative-pole metal foil, and a solid positive-pole metal rail is electrically conductively connected to the positive-pole metal foil and is insulated from the negative-pole metal rail, for carrying direct current in an input and/or output range of the output capacitor array.

13 Claims, 3 Drawing Sheets

OUTPUT CAPACITOR ARRAY OF A SWITCHED-MODE POWER SUPPLY

BACKGROUND OF THE INVENTION

1. Field of the Invention

The invention relates to an output capacitor array of a switched-mode power supply, having at least two individual capacitors being connected electrically in parallel, a solid negative-pole metal rail, and a solid positive-pole metal rail being electrically insulated from the negative-pole metal rail, for carrying direct current.

Such an array and a switched-mode power supply that contains the capacitor array is known from German Petty Patent G 90 07 402.

The switched-mode power supply described therein has a wide ribbon cable on the secondary side of a transformer, that is passed as a secondary winding around one leg of the transformer and, with the interposition of a rectifier configuration, is passed as a parallel-guided flat twin cable through core parts of a smooth inductor to output terminals. An output capacitor in the form of a plurality of parallel-connected capacitors is disposed in a region between the smoothing inductor and the output terminals. The capacitors are disposed on one of the ribbon conductors or between the two ribbon conductors and are electrically connected to them.

The capacitor array according to the invention is suitable for use as an output capacitor in such a switched-mode power supply, but is also suitable for use in other switched-mode power supplies.

In switched-mode power supplies with a high switching frequency and a one-stage output filter, filter capacitors are needed that have the lowest possible equivalent series resistance or ESR, for instance less than one milliohm, relative to the entire capacitor bank. If the frequencies to be filtered are high, such as 50 to 500 kHz, then not only the ESR but especially the equivalent series inductance or ESL of the capacitor has a decisive influence. ESL values< 1 nH, for instance, are required for the overall capacitor array. If a plurality of capacitors are connected in parallel, those requirements must be taken into account, as must the fact that a uniformly high alternating current load of the individual capacitors should be attained. In switched-mode power supplies with high output currents, the capacitors must be connected to solid copper rails, while maintaining the inductance conditions.

With the filter configuration known from German Petty Patent G 90 07 402, such requirements cannot be met satisfactorily. In particular, the capacitors are not connected in an adequately low-inductance way.

SUMMARY OF THE INVENTION

It is accordingly an object of the invention to provide an output capacitor array of a switched-mode power supply, which overcomes the hereinafore-mentioned disadvantages of the heretofore-known devices of this general type and which provides an output filter array with low-inductance coupling of parallel-connected capacitors to current rails that carry direct current.

With the foregoing and other objects in view there is provided, in accordance with the invention, an output capacitor array of a switched-mode power supply, comprising at least one substrate having a layered stack of a positive-pole metal foil, an insulating foil, and a negative-pole metal foil; a plurality of electrically parallel connected individual capacitors disposed on the at least one substrate, the capacitors having positive poles each being electrically conductively connected to the positive-pole metal foil, and the capacitors having negative poles each being electrically conductively connected to the negative-pole metal foil; and a solid negative-pole metal rail being electrically conductively connected to the negative-pole metal foil, and a solid positive-pole metal rail being electrically conductively connected to the positive-pole metal foil and being insulated from the negative-pole metal rail, for carrying direct current in at least one of an input and output range of the output capacitor array.

In accordance with another feature of the invention, the metal foils of the at least one substrate are from 20 to 500 m and preferably 100 μm thick.

In accordance with a further feature of the invention, the substrate is folded at least once in a meandering manner.

In accordance with an added feature of the invention, the metal rails and the metal foils are formed of copper.

In accordance with an additional feature of the invention, one of the rails is flat and is a cooling device or is mounted directly onto and is electrically insulated from or not insulated from a heat sink.

In accordance with yet another feature of the invention, the substrate assembled with the capacitors is disposed between and is electrically connected to the current rails with low inductance over a large surface area.

In accordance with yet a further feature of the invention, there are provided means, such as screws or a solder connection, for establishing mechanical and electrical contact between the substrate and the current rails.

In accordance with a concomitant feature of the invention, the substrate with the layered stack of foils is an electrically insulated printed circuit board with copper laminations.

The invention, with the aid of the capacitor-equipped substrate, advantageously attains an extremely low-inductance coupling of the parallel-connected capacitors to the direct current rails, and at the same time a uniform distribution of current among the individual capacitors. The current distribution is determined practically by the ESR and ESL of the individual capacitors. The especially low-inductance coupling also ensures that the entire output capacitance of a switched-mode power supply is also available externally as a stabilizing capacitor or in other words provides for stabilization of the output voltage if rapid load changes occur. With DC consumers or loads connected, this means that additional smoothing capacitors are unnecessary.

In terms of control technology, this output capacitor array, together with the choke coil preceding it in a switched-mode power supply, forms a one-stage filter unit. This provides easy controllability of the entire system.

A further advantage is that the array can be cooled properly, since good thermal coupling of the capacitors to a heat sink is attainable through the substrate and one of the DC rails.

Manufacture of the capacitor array can be automatic to a large extent. In particular, soldering of the capacitors to the substrate can be performed with soldering robots.

Other features which are considered as characteristic for the invention are set forth in the appended claims.

Although the invention is illustrated and described herein as embodied in an output capacitor array of a switched-mode power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
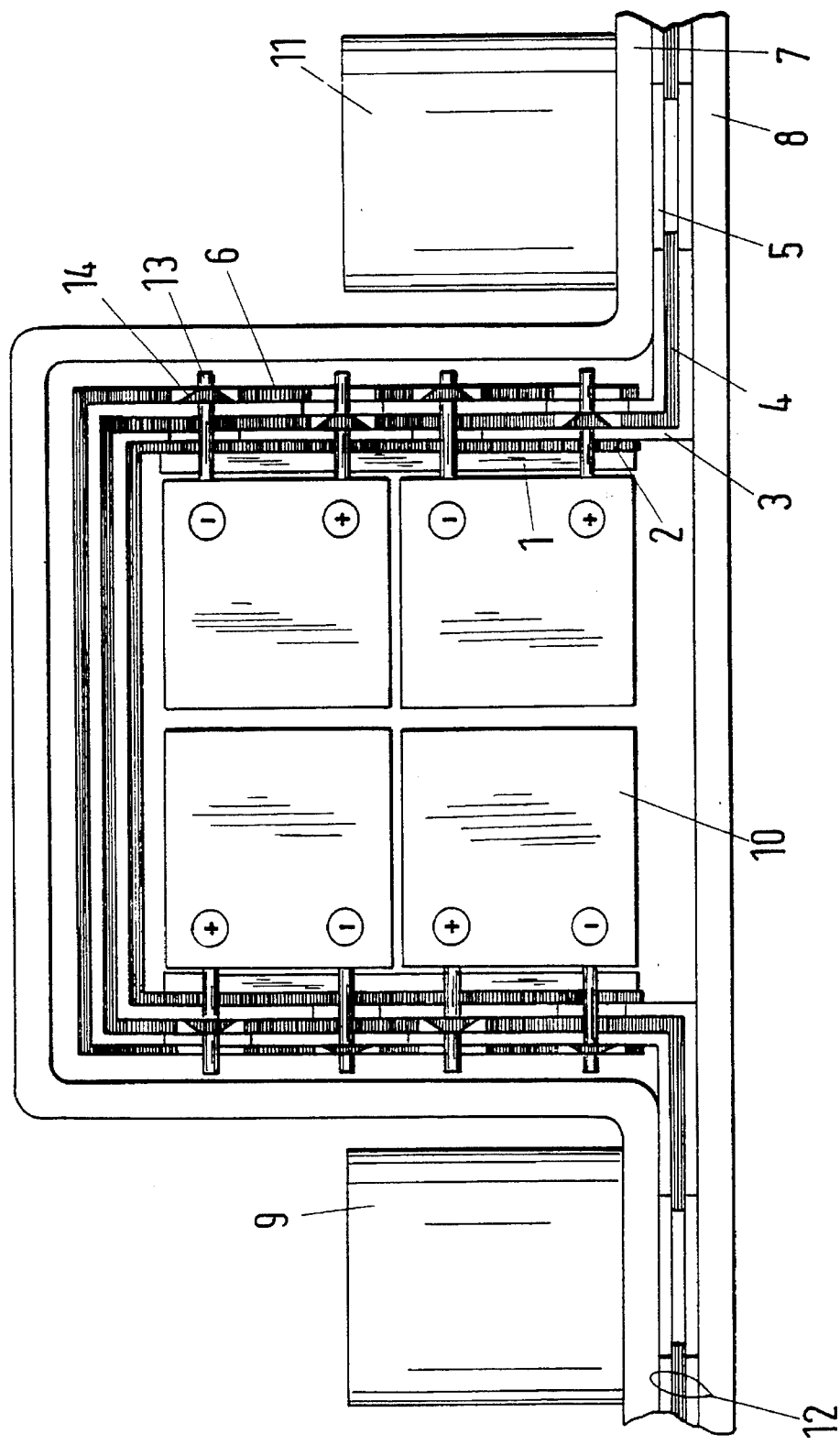
FIG. 1 is a fragmentary, diagrammatic, side-elevational view of a first embodiment of a capacitor array according to the invention.

Referring now to the figures of the drawing in detail and first, particularly, to FIG. 1 thereof, there is seen an output part of a switched-mode power supply, the other parts of which are not shown. This output part represents an output capacitor array according to the invention. The array includes a positive-pole metal rail 8 and a negative-pole metal rail 7, which carry a direct current. These metal rails 7, 8 are formed of a metal with good electrical conductivity such as copper. The negative-pole rail 7 is extended in a meandering loop, creating a space between the metal rails 7, 8 that is substantially filled with individual capacitors 10. The capacitors 10 are joined to a substrate 12, which includes a layered stack of a positive-pole metal foil 3, an insulating foil 4, and a negative-pole metal foil 5. The metal foils 3, 5 may be made of copper, and the insulating foils may, for instance, be made of polyimide. The foils 3, 4, 5 may be joined together by adhesive bonding or pressing, for instance.

In the exemplary embodiment, a preferred meandering version of the substrate 12 in terms of the shape of the negative-pole metal rail 7 is shown. However, the substrate 12 might also be extended in some other way, such as parallel to the flat negative-pole metal rail 8.

By way of example, the individual capacitors 10 are radially wired standard capacitors with intrinsic component ESR and ESL. For reasons of convenience, in the drawing the capacitors 10 have been shown rotated through 90° in FIG. 1, so that positive and negative capacitor connection legs 13 are located one above the other instead of one behind the other. This should be taken into account in comparing it with FIG. 2.

The positive and negative capacitor connection legs 13 of the capacitors 10 are soldered at soldering points 14 to the corresponding metal foils 3, 5.

Figure 2:
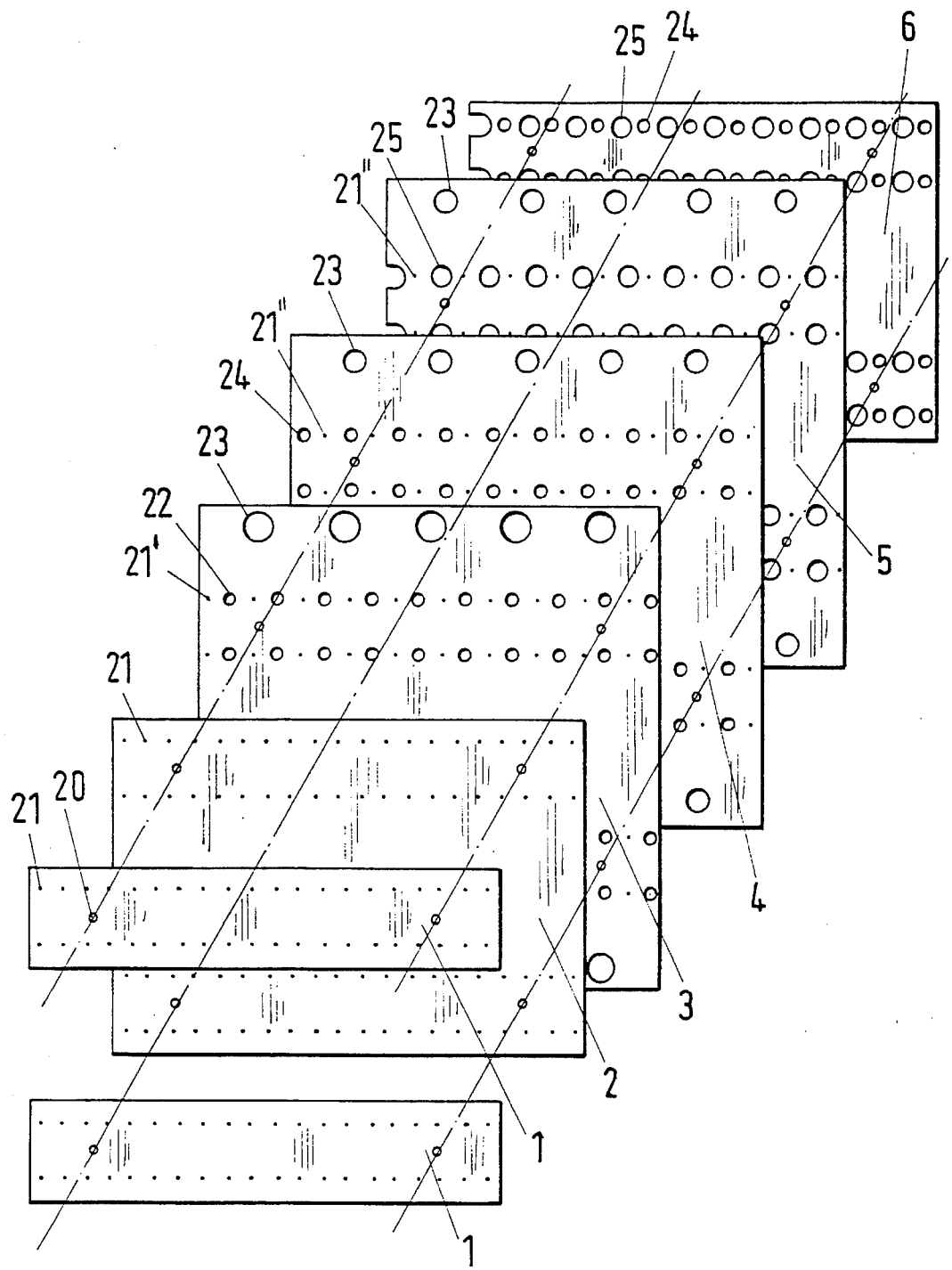
FIG. 2 is an enlarged, exploded view of a substrate of the invention.

In FIGS. 1 and 2, besides the foils 3, 4, 5 that are necessary for the substrate 12, other layer elements are also shown, which are suitable for a practical embodiment of the capacitor array. Therefore, an electrically insulating protective foil 2 that acts as a surface protector is disposed as a soldering stop on top of the positive-pole metal foil 3. A reinforcement board 1 that presses the flexible substrate 12 flat, is disposed over the protective foil 2 in some regions. A soldering stop foil 6 or a resist layer of equivalent function is applied over the other side of the substrate 12, namely over the negative-pole metal foil 5.

At least in the input region or the output region of the entire array, the substrate 12 must have good electrical contact with the DC rails 7, 8. At these two points, the contact may be produced as shown in FIG. 1. The necessary connection may be produced by soldering, clamping or screw fastening, for instance, while taking into account the requisite electrical insulation between the positive and negative pole. In FIG. 1, screw connections made by means of clamp strips 9, 11 are suggested, but the metal screws and associated insulating parts are not shown. In this case, the term "clamp strips" is understood not to mean electrical terminal strips but rather rows of screw fasteners that connect the substrate 12 to the metal rails 7 and 8.

FIG. 2 shows required bores in the various layer elements 1–6. All of the elements 1–6 have adjusting holes 20, which are needed to adjust the layer elements during manufacture. The reinforcement board 1 and the protective foil 2 have through holes 21 for the capacitor connection legs 13 seen in FIG. 1. The positive-pole metal foil 3 has ducts 21' for the positive capacitor connection legs 13 of the capacitors, which are soldered at those points to the foil 3. Larger ducting holes 22 are present for ducting the negative capacitor connection legs 13 in an insulated way. Large bores 23 serve the purpose of insulated ducting of fastening screws of the clamp strips 9, 11, which are provided in order to put the substrate 12 into contact with the DC rails 7, 8.

The insulating foil 4 has not only the large bores 23 but also ducts 21" for the negative capacitor connection legs 13, as well as large soldering openings 24, that enable solder to be delivered to the soldering points on the metal foil 3.

The negative-pole metal foil 5 has the large bores 23 for the fastening screws and the ducts 21" for the negative capacitor connection legs, which are soldered to the foil 5. Adequately large openings 25 are also present in the region of the positive connection legs, in order to prevent a soldering bridge between these connections and the foil 5. The insulating foils 2, 4, 6 may all be made of polyimide, while the metal foils 3, 5 may be made of a copper foil that is 70 μm thick, for instance.

In terms of manufacturing options for the output filter array, it may be added to the above description that the multi-layer substrate can be assembled in a horizontal position and soldered by a soldering robot, for instance with a solder wave. All of the capacitors are electrically connected in parallel by the connection of the respective connection legs to the associated metal foils of the substrate. The assembled, soldered substrate may then be folded as a capacitor bank as shown in FIG. 1 and mounted between the DC rails. In this mounting operation, with the aid of the screws in the clamp strips 9, 11, a pressure contact is brought about between the positive pole rail 8 and positive-pole foil 3, on one hand, and between the negative-pole rail 7 and the negative-pole foil 5, on the other hand. The screws must be suitably insulated since they are passed through the rails and foils, in order to prevent a short circuit. The foils and rails that belong together may be connected by means of a soldered contact. The mode of operation of the capacitors, as an output part of a switched-mode power supply, will become apparent from the following discussion.

The output DC of the switched-mode power supply takes the path of least resistance, or in other words it flows through the solid current rails 7, 8, which have a large metal cross section. This path bypasses the capacitors on the outside. Due to this separate DC path, high output direct currents can be achieved in the array, for instance in the range of 100 A to 10 kA, by means of a suitably large metal cross section.

The alternating current component in the output current takes the path of least alternating current resistance. With a suitable magnitude of the frequency, for instance in the range from 50 to 500 kHz, the AC resistance is determined primarily by the inductive component. In the current-compensated substrate, the DC component finds virtually no inductance. An AC flow through the outer current rails 7, 8 would set up a large loop, which means high inductance. Accordingly, the AC current flows virtually only in the substrate 12, to which the capacitors that receive and filter the AC component are bound.

The AC distribution of the capacitors among one another is effected in accordance with the particular series inductance of the individual capacitors. Since the inductance of the substrate is low as compared with the inherent inductance of the capacitor, the location of the capacitor plays only a subordinate role in terms of the AC load. If the internal inductance is the same, then all of the capacitors are approximately equally well coupled. The result is a balanced distribution of current to all of the capacitors being connected.

Another essential factor is that the entire capacitance of the parallel-connected individual capacitors, coupled with low inductance, is available at the output. This makes for very good stability of the output voltage in the event of rapid load changes in this array.

Figure 3:
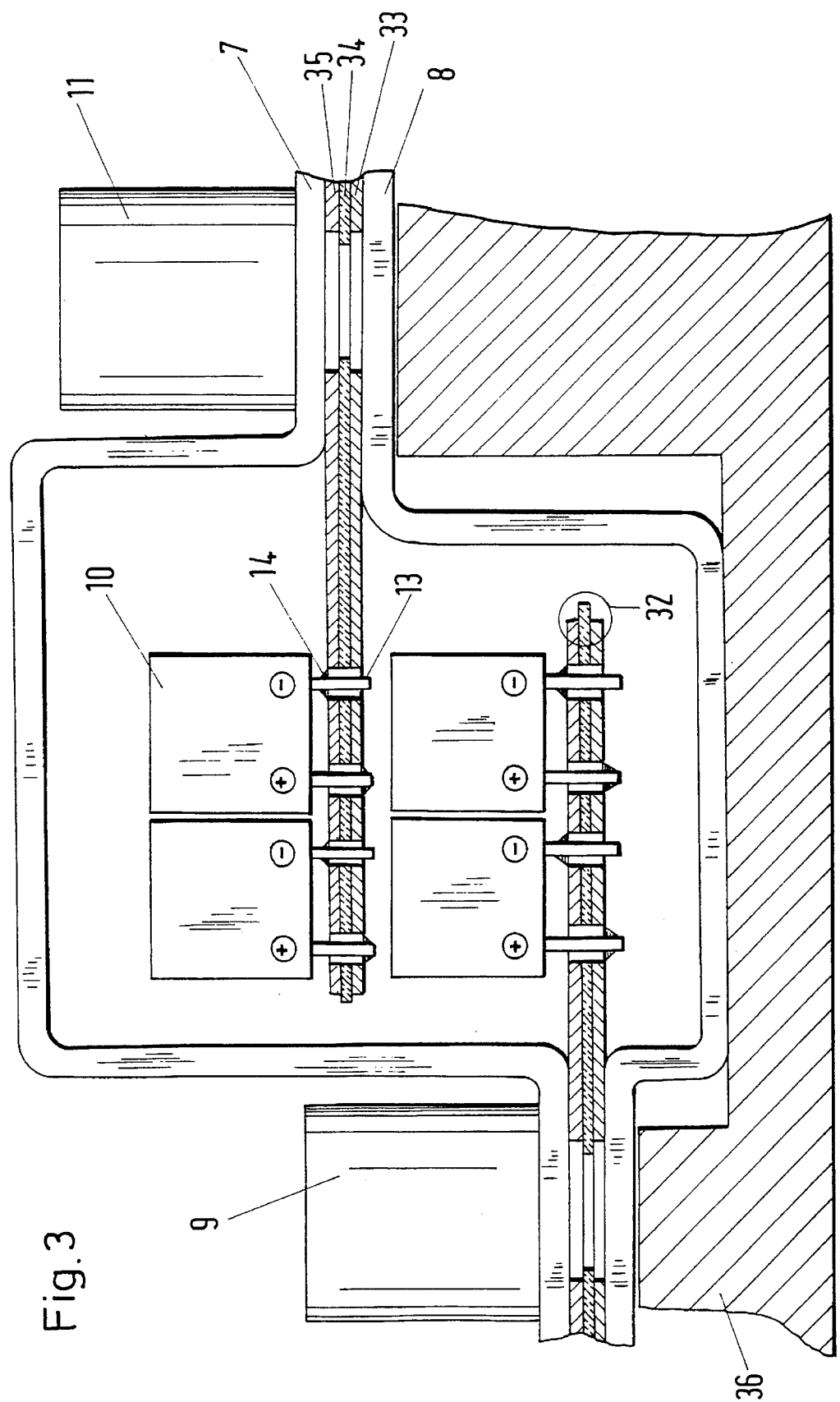
FIG. 3 is a view similar to FIG. 1 of a second embodiment of the invention.

FIG. 3 shows a second embodiment of an output capacitor array. As compared to the configuration shown in FIG. 1, the substrate 12 therein is replaced by two substrates 32, which are each formed of a printed circuit board PCB. Such a substrate 32 is formed of an electrically insulating printed circuit board 34, which is provided with a metal lamination 33, 35 on both main surfaces. Such a configuration can also be mounted on a heat sink or cooling body 36. The output capacitor array shown in FIG. 3 actually has filter characteristics which are somewhat less advantageous than the configuration shown in FIG. 1, but with a lower cost of manufacture.

We claim:

1. An output capacitor array of a switched-mode power supply, comprising:
   a) at least one substrate having a layered stack of a positive-pole metal foil, an insulating foil, and a negative-pole metal foil;
   b) a plurality of electrically parallel connected individual capacitors disposed on said at least one substrate, said capacitors having positive poles each being electrically conductively connected directly to said positive-pole metal foil, and said capacitors having negative poles each being electrically conductively connected to said negative-pole metal foil; and
   c) a solid negative-pole metal rail being electrically conductively connected to said negative-pole metal foil, and a solid positive-pole metal rail being electrically conductively connected to said positive-pole metal foil and being insulated from said negative-pole metal rail, for carrying direct current in at least one of an input and output region of the output capacitor array.

2. The array according to claim 1, wherein said metal foils of said at least one substrate are from 20 to 500 μm thick.

3. The array according to claim 1, wherein said metal foils of said at least one substrate are 100 μm thick.

4. The array according to claim 1, wherein said substrate is folded at least once in a meandering manner.

5. The array according to claim 1, wherein said metal rails and said metal foils are formed of copper.

6. The array according to claim 1, wherein one of said rails is flat and is a cooling device.

7. The array according to claim 1, wherein one of said rails is mounted directly onto and is electrically insulated from a heat sink.

8. The array according to claim 1, wherein one of said rails is mounted directly onto a heat sink without electrical insulation.

9. The array according to claim 1, wherein said substrate assembled with said capacitors is disposed between and is electrically connected to said current rails with low inductance over a large surface area.

10. The array according to claim 1, including means for establishing mechanical and electrical contact between said substrate and said current rails.

11. The array according to claim 10, wherein said contact means are screws.

12. The array according to claim 10, wherein said contact means are solder connections.

13. The array according to claim 1, wherein said substrate with said layered stack of foils is an electrically insulated printed circuit board with copper laminations.

\* \* \* \* \*